US009305279B1

(12) United States Patent
Menzel (10) Patent No.: US 9,305,279 B1
(45) Date of Patent: Apr. 5, 2016

(54) RANKING SOURCE CODE DEVELOPERS (71) Applicant: Semmle Limited, Oxford (GB)

(72) Inventor: Galen Menzel, Oxford (GB)

(73) Assignee: Semmle Limited, Oxford (GB)

( * ) Notice: Subject to any disclaimer, the term of this patent is extended or adjusted under 35 U.S.C. 154(b) by 20 days.

(21) Appl. No.: 14/534,712

(22) Filed: Nov. 6, 2014

(51) Int. Cl.
*G06F 9/44* (2006.01)
*G06Q 10/06* (2012.01)

(52) U.S. Cl.
CPC .............................. *G06Q 10/06398* (2013.01)

(58) Field of Classification Search
CPC ........ G06F 8/70; G06F 8/77; G06Q 10/06398
USPC .................. 717/101–109, 120–121
See application file for complete search history.

(56) References Cited

U.S. PATENT DOCUMENTS

| 6,405,364 | B1 * | 6/2002 | Bowman-Amuah ... G06Q 10/06 717/101 |
| 6,601,233 | B1 * | 7/2003 | Underwood .............. G06F 8/24 717/100 |
| 6,715,130 | B1 * | 3/2004 | Eiche et al. .................... 715/210 |
| 7,243,335 | B1 * | 7/2007 | Andrew et al. ............... 717/115 |
| 7,398,510 | B2 * | 7/2008 | Lake .............................. 717/101 |
| 7,505,952 | B1 * | 3/2009 | Engler ............................ 706/47 |
| 7,620,634 | B2 | 11/2009 | Ramsey |
| 7,810,067 | B2 * | 10/2010 | Kaelicke ................... G06F 8/20 717/102 |
| 7,890,924 | B2 * | 2/2011 | Raffo .................. G06F 17/5009 717/100 |
| 7,904,802 | B1 * | 3/2011 | Kolawa et al. ................. 715/230 |
| 7,958,494 | B2 * | 6/2011 | Chaar ....................... G06F 8/36 717/101 |
| 7,975,257 | B2 * | 7/2011 | Fanning et al. ............... 717/124 |
| 8,069,434 | B2 * | 11/2011 | Ploesser ..................... G06F 8/20 717/104 |
| 8,141,040 | B2 * | 3/2012 | Chaar ....................... G06F 8/10 717/101 |
| 8,146,058 | B2 * | 3/2012 | Sarkar ....................... G06F 8/10 717/101 |
| 8,180,766 | B2 | 5/2012 | Yang et al. |
| 8,296,719 | B2 * | 10/2012 | Chaar .................... G06Q 10/00 700/95 |
| 8,386,994 | B2 * | 2/2013 | Subash ..................... G06F 8/10 705/300 |

(Continued)

FOREIGN PATENT DOCUMENTS

WO   WO2008016494   2/2008

OTHER PUBLICATIONS

Cruz et al, "Towards Logistic Regression Models for Predicting Fault-prone Code across Software Projects", IEEE, pp. 460-463, 2009.*

(Continued)

*Primary Examiner* — Anil Khatri
(74) *Attorney, Agent, or Firm* — Fish & Richardson P.C.

(57) ABSTRACT

Methods, systems, and apparatus, including computer programs encoded on computer storage media, for ranking developers. One of the methods includes obtaining data representing a plurality of developer actions for a developer, obtaining a net violation baseline for the code base, wherein the net violation baseline represents a measure of violation introductions compared to violation removals by a typical high-productivity developer of the code base, obtaining a developer action baseline for the code base, the developer action baseline representing a number of developer actions for the typical high-productivity developer of the code base. A net violation value and a developer action value are computed for the developer. A score is computed for developer including comparing the sum of the net violation value and the net violation baseline to the sum of the developer action value and the developer action baseline. The developer is ranked relative to other developers by the score.

25 Claims, 5 Drawing Sheets

(56) References Cited

U.S. PATENT DOCUMENTS

| | | | | |
|---|---|---|---|---|
| 8,464,207 B2* | 6/2013 | Pouliot | ............... | G06F 8/71 717/101 |
| 8,615,741 B2* | 12/2013 | Hudson | ............... | 717/125 |
| 8,781,915 B2 | 7/2014 | Herbrich et al. | | |
| 2002/0042793 A1 | 4/2002 | Choi et al. | | |

OTHER PUBLICATIONS

Yi et al, "A Synergistic Analysis Method for Explaining Failed Regression Tests", IEEE, pp. 257-267, 2015.*

Bird et al, "Don't Touch My Code! Examining the Effects of Ownership on Software Quality", ACM, pp. 4-14, 2011.*

Edwards et al, "AFID: An Automated Fault Identification Tool", ACM, pp. 179-188, 2008.*

Hanazumi et al, "Generation of Java Programs Properties from Test Purposes", ACM, pp. 362-365, 2013.*

Rojas et al, "Automated Unit Test Generation during Software Development: A Controlled Experiment and Think-Aloud Observations", ACM, pp. 338-349, 2015.*

Norberg, R., "Credibility Theory", Encyclopedia of Actuarial Science, Sep. 15, 2006, 17 pp.

Helling, Rutger. "SuMDb-Summarizing a year in movies.", Apr. 2012, 11 pp.

* cited by examiner

| Rank | Name | Introduced (n) | Removed (f) | Total Churn (c) | Score | Violation Density |
|---|---|---|---|---|---|---|
| 1 | Mary | 300 | 2000 | 40000 | -0.035733 | -0.042500 |
| 2 | John | 3 | 30 | 400 | -0.021498 | -0.067500 |
| 3 | Bill | 50 | 30 | 435 | -0.017602 | 0.045977 |
| 4 | Tina | 45 | 78 | 3452 | -0.017547 | -0.009560 |
| 5 | Frank | 332 | 135 | 2938 | -0.002810 | 0.067052 |
| 6 | Susan | 755 | 455 | 10637 | 0.002504 | 0.028203 |

RANKING SOURCE CODE DEVELOPERS

BACKGROUND

This specification relates to static analysis of computer software source code.

Static analysis refers to techniques for analyzing computer software source code without executing the source code as a computer software program.

Source code is typically maintained by developers in a code base of source code using a version control system. Version control systems generally maintain multiple revisions of the source code in the code base, each revision being referred to as a snapshot. Each snapshot includes the source code of files of the code base as the files existed at a particular point in time.

Relationships among snapshots stored in a version control system can be represented as a directed, acyclic revision graph. Each node in the revision graph represents a commit of some portion of the source code of the code base. Each commit identifies source code of a particular snapshot as well as other pertinent information about the snapshot, such as the author of the snapshot and data about ancestors of the commit in the revision graph. A directed edge from a first node to a second node in the revision graph indicates that a commit represented by the first node occurred before a commit represented by the second node, and that no intervening commits exist in the version control system.

A static analysis system can compile source code of a particular snapshot of the code base to identify characteristic segments of source code in the snapshot. For example, a static analysis system can identify violations in the source code of a particular set of coding standards. A static analysis system can also identify a responsible contributor for each characteristic segment of source code and attribute the characteristic segment to the responsible contributor, e.g., to a particular developer or group of developers.

A static analysis system can rank developers according to violation counts. For example, the system can keep track of how many violations each developer introduces into the code base and how many violations each developer removes from the code base.

Violation counts are influenced significantly by the number of lines of code added, deleted, or changed, also referred to as the churn or the number of lines of churn, by each particular developer. Thus, a developer with high churn is likely to have removed more violations than a developer who is new to the team.

A static analysis system can also rank developers according to a violation density score. The violation density score is generally computed as a net of violation introductions n and violation removals f attributed to the developer, divided by the churn c attributed to the developer. Thus, the violation density score d can be computed according to:

$$d = \frac{n-f}{c}.$$

Violation density scores are also influenced significantly by the number of lines of churn a particular developer has contributed. For example, a developer who has 10 net violations in 100 lines of churn may have a relatively high violation density. However, this score may not be a meaningful indicator of the developer's effectiveness until more data establishes that the violations are an ongoing pattern rather than an aberration due to the low churn or due to a problematic segment of source code.

SUMMARY

This specification describes how a static analysis system can rank contributors of source code to a code base according to a score that represents the effectiveness of the contributor relative to other contributors of source code to the code base and that is not overly influenced by their relative numbers of lines of churn.

In general, one innovative aspect of the subject matter described in this specification can be embodied in methods that include the actions of obtaining data representing a plurality of developer actions for a developer, wherein each developer action is classified as being either a violation introduction attributed to the developer, a violation removal attributed to the developer, or a unit of churn attributed to the developer; obtaining a net violation baseline for the code base, wherein the net violation baseline represents a measure of violation introductions compared to violation removals by a typical high-productivity developer of the code base; obtaining a developer action baseline for the code base, the developer action baseline representing a number of developer actions for the typical high-productivity developer of the code base; computing a net violation value for the developer, the net violation value representing a measure of violation introductions attributed to the developer compared to violation removals attributed to the developer; computing a developer action value for the developer, the developer action value representing a total number of developer actions of the developer; computing a score including comparing the sum of the net violation value and the net violation baseline to the sum of the developer action value and the developer action baseline; and ranking the developer relative to one or more other developers according to the computed score. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The score represents the expected long term effect on the code base of violation introductions and violation removals attributed to the developer. The number of developer actions is a predetermined constant number of developer actions. A particular fractile of the developers have a number of attributed actions that is less than the developer action baseline. The score S is given by:

$$S = \frac{n-f+B}{n+f+c+m},$$

wherein n is a count of violations introductions attributed to the developer, f is a count of violation removals attributed to the developer, B is the net violation baseline, c is the churn attributed to the developer, and m is the developer action baseline. The actions include determining that the developer has a rank that satisfies a threshold relative to other developers in a team of developers; and generating a notification to a team leader of the team of developers. The actions include determining that the developer has a low rank relative to other developers in a team of developers; and providing a suggestion that the developer be paired with another developer having a high rank. The actions include determining that the developer has a high rank relative to other developers in a team of developers; and providing a suggestion that the developer be paired with another developer having a low rank.

Particular embodiments of the subject matter described in this specification can be implemented so as to realize one or more of the following advantages. Ranking developers according to the techniques described below does not result in a ranking that is dominated by developers with high churn or developers with low churn. The score is also useful for ranking because it represents a measure of effectiveness of the particular developer relative to other developers on the team or in the organization. The ranking allows an organization to immediately identify contributors having a high number of problematic contributions to a code base, which can allow individually tailored training Ranking developers can result in gamification of a project, which results in developers who are more engaged and perform at a higher level. Ranking developers can help identify contributors having a consistently low number of problematic contributions or a high number of good contributions, and these developers can be rewarded. Developers with high and low numbers of contributions can be paired together for team programming and training purposes.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A static analysis system can compute a score for a particular source code contributor, which may be an individual developer or a group of developers. The score represents a measure of effectiveness of the contributor. Thus, the score represents a measure of the tendency of the contributor to make net positive or negative contributions to the source code. In this specification, where reference is made to computing a score for a developer, the same techniques can also be applied to any appropriate contributor of source code to a code base, e.g., a team of developers in an organization or a selected group of developers.

The system can compute the score according to how many developer actions are classified by the system as being positive, negative, or neutral contributions by the developer to the code base, relative to actions classified as positive, negative, and neutral contributions by all developers to the code base.

In the systems described below, the positive and negative contributions of developers are measured as a number of violations introductions or violation removals attributed to the developer or a group of developers. In general, a source code violation is a segment of source code that includes a violation of a particular coding standard. Violations of coding standards can be represented by data elements, and will also be referred to simply as violations when the meaning is clear from context. However, a static analysis system can use the same techniques described below to compute a measure of developer effectiveness using any measure of positive and negative contributions to the code base. For example, a system can use, as a measure of contributions to a code base, a count of bugs removed, issues resolved, or compiling or linking errors introduced or removed by developers, to name just a few examples.

Each positive, negative, and neutral contribution by a developer can be considered one developer action. Thus, some developer actions may overlap. For example, a developer committing one line of source code that introduces one violation can be considered to have contributed two developer actions, one negative and one neutral. Similarly, a developer committing a change to one line of source code that introduces one violation and removes another violation can be considered to have contributed three developer actions, one positive—the removal of the violation, one negative—the introduction of the other violation, and one neutral—the contribution of the change to the line of source code.

Figure 1:
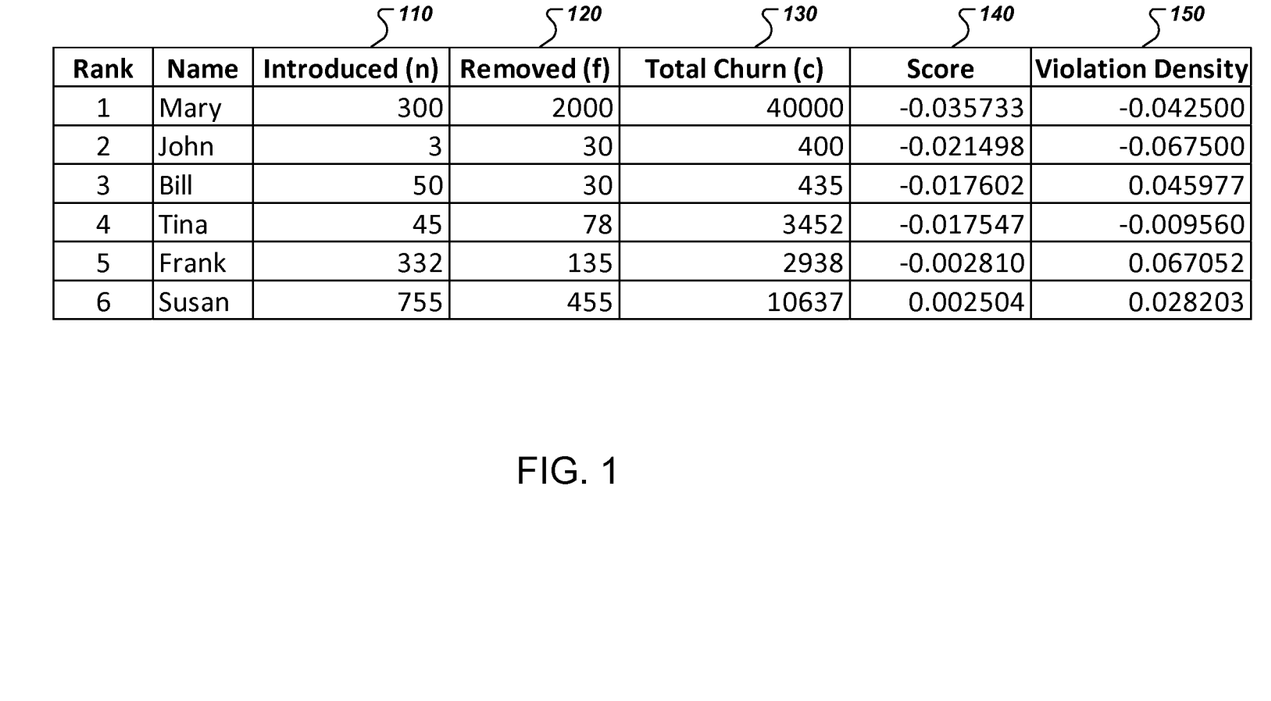
FIG. 1 illustrates an example ranking of developers.

FIG. 1 illustrates an example ranking of developers. Each developer has an associated number of violations introductions 110, violation removals 120, and churn 130 attributed to the developer. Each unit of churn 130 represents a line of code added, changed, or deleted in snapshots of the code base attributed to each developer. The units of churn 130 may also represent a number of files modified, commits, or any combination of these.

The developers are ranked by the effectiveness score 140, which can represent the expected net violations to be introduced by the developer per developer action while taking into account the performance of a typical high-productivity developer of the code base. The effectiveness score 140 can be used as a measure of the effectiveness of the developer relative to other developers in the code base. In this example ranking, a lower score represents a more effective developer. A system can compute the score 140 such that it is not overly sensitive to the relative number of lines of churn contributed by each developer.

The effectiveness score 140 may represent how developers compare to a typical, high-productivity developer of the code base. A system may start off each developer with a default score that is equal to the score of the typical, high-productivity developer. Then, as more evidence accumulates for each developer, their individual effectiveness scores will deviate from that of the typical, high-productivity developer. The computation of the score 140 will be described in more detail below with reference to FIG. 5.

In contrast to the effectiveness score 140, a simple violation density score 150 is highly sensitive to the number of lines of churn contributed by each individual developer. For example, John has a better violation density than Mary. However, this difference may not be significant when taking into account the fact that that Mary has contributed 100 times as many lines of churn to the code base as John.

Thus, although John may eventually prove to be a more effective source code developer than Mary, so far his contributions are not significant enough for that to be reflected by the score 140.

As another example, Bill has actually introduced more violations than he has removed, while Tina has removed more violations than she has introduced. However, because Bill's total contribution thus far is relatively small compared to that of Tina, Bill's score is still close to the default score and is thus ranked above Tina. Although Tina has removed violations, she has removed fewer than the typical, high-productivity developer. Furthermore, the number of Tina's developer actions is large enough to establish a pattern in her performance. Thus, she is ranked below Bill according to the effectiveness score 140.

Figure 2:
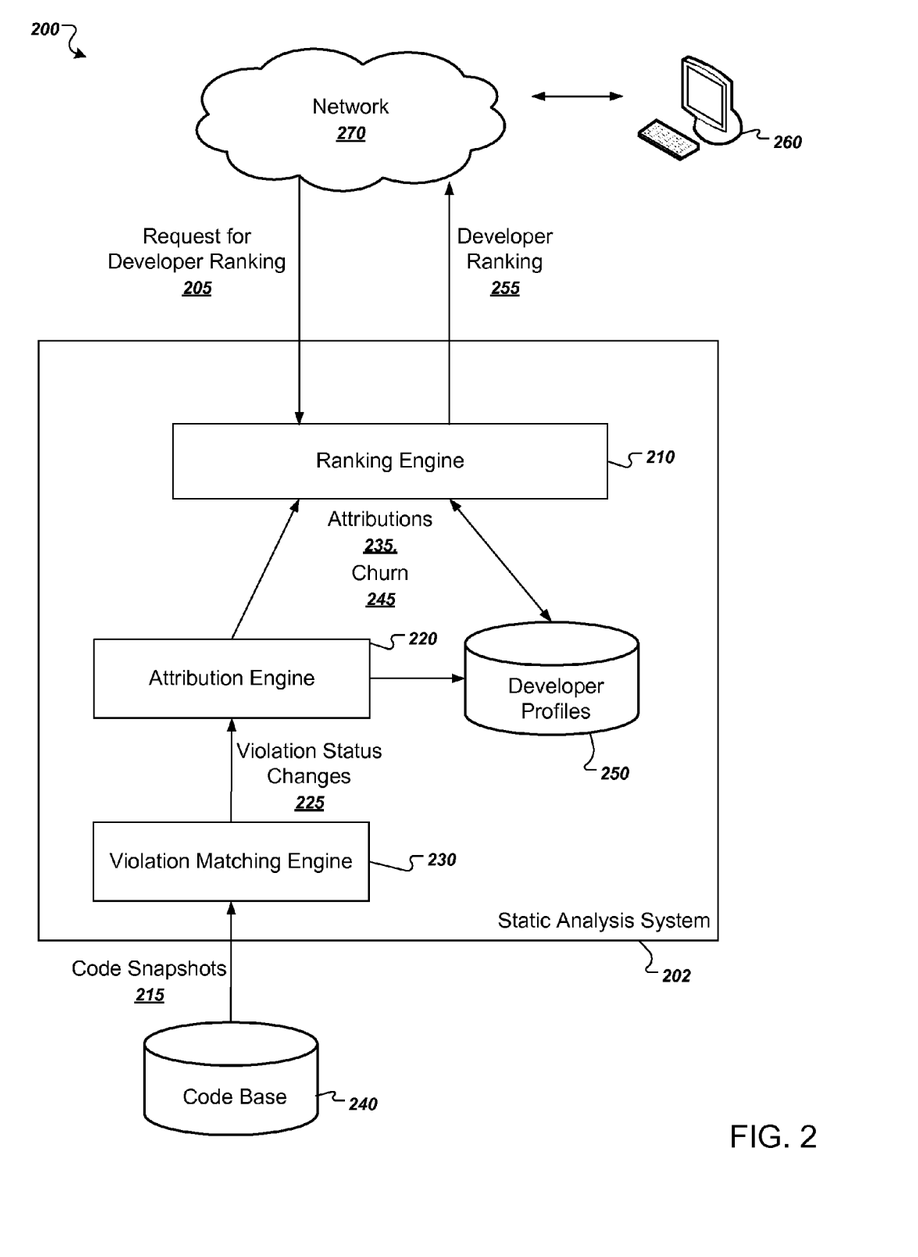
FIG. 2 is a diagram of an example system.

FIG. 2 is a diagram of an example system 200. The system 200 includes a user device 260 in communication with a static analysis system 202 over a network 270. The static analysis system 202 includes several components, including a ranking engine 210, an attribution engine 220, and a violation matching engine 230. The components of the static analysis system 202 can be implemented as computer programs installed on one or more computers in one or more locations that are coupled to each through a network.

A user of user device 260 can use the static analysis system 202 to obtain rankings of developers of a code base 240. A user can submit a request for developer rankings 205 to the static analysis system 202 over the network 270, which can be any appropriate data communications network, e.g., one that includes an intranet or the Internet.

The request can include a code base identifier of the code base 240 for analysis and one or more requested parameters. For example, the request for a developer ranking can specify a particular time period over which to rank developers, can specify identifiers of a subset of developers, or can specify a particular group or team of developers.

Before or after the request for a developer ranking 205 is received, the static analysis system 202 can use a violation matching engine 230 to identify source code violations that occur in each code snapshot 215 of the code base 240. The violation matching engine 230 can also determine which of the violations are matching violations between adjacent snapshots in a revision graph of the code base. Non-matching violations between snapshots in the revision graph represent violation status changes 225, which are either violations newly introduced into the code base by a particular snapshot, or violations newly removed from the code base by a particular snapshot.

The attribution engine 220 receives the violation status changes 225 from the violation matching engine 230. The attribution engine 220 then determines a responsible entity for each of the violation status changes 225, which can be an individual developer, a team of developers within an organization, or another group of developers.

Example processes for matching violations and attributing violation status changes are described in commonly owned U.S. Patent Application No. 61/983,932, for "Source Code Violation Matching and Attribution," to Henriksen et al., which is incorporated here by reference. Alternatively, the violation status changes 225 and corresponding attributions 235 can be obtained from other sources rather than being computed by the static analysis system 202.

The attribution engine 220 can store the attributions 235 in a collection of developer profiles 250 that stores information about each developer that has contributed to the code base 240. For example, the attribution engine 220 can store, for each developer in the developer profiles 250, data representing violation introductions attributed to the developer, violation removals attributed to the developer, and the lines of churn attributed to the developer.

The ranking engine 210 receives data representing the attributions 235 and data representing churn 245 for each particular developer. The attributions 235 and churn 245 can be received from either the attribution engine 220 or from the developer profiles 250.

The ranking engine 210 computes a score for each developer and generates a developer ranking 255 according to the score for each developer. The ranking engine 210 can then provide the developer ranking 255 back to the user device 260 in response to the request. For example, the ranking engine 210 can generate a graphical presentation of the developer ranking 255 and provide the presentation back to the user device 260 in an appropriate format, e.g., as a hypertext markup language (HTML) or Extensible Markup Language (XML) document for display be a web browser, for example. Some implementations include an application for the user device 260 that implements a user interface and can display, in a text or graphical form, data received from the ranking engine 210. For user devices that are smart phones, the application can be what is referred to as an "app."

Figure 3:
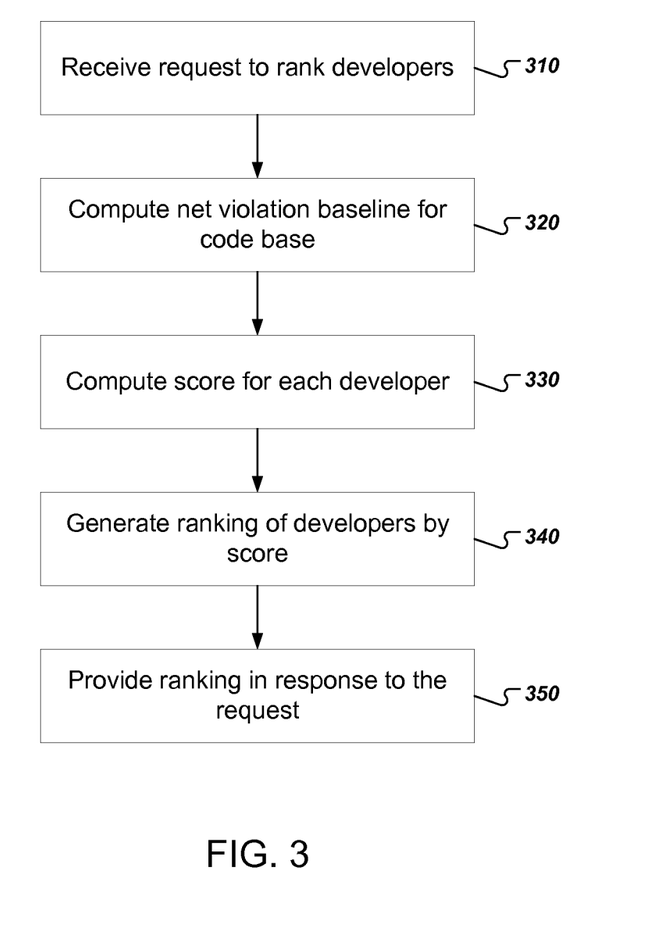
FIG. 3 is a flow chart of an example process for generating a ranking of developers.

FIG. 3 is a flow chart of an example process for generating a ranking of developers. A static analysis system can generate a ranking of developers that represents a measure of effectiveness of the developer and provide the ranking in response to a request for developer rankings. The example process can be implemented by one or more computer programs installed on one or more computers. The process will be described as being performed by an appropriately programmed system of one or more computers, e.g., the ranking engine 210 of FIG. 2.

The system receives a request to rank developers (310). The request can be submitted to the system by a user who desires to gain insight into the relative effectiveness of developers who have contributed source code to the code base.

The request can specify an identifier of a particular code base, or a particular project, or a particular directory within a code base. The system can then generate a ranking of all or a subset of developers that contributed changes to the particular requested portion of the code base. The request can also specify a particular subset of developers to be ranked.

The request can also specify the start and end points of a particular time period over which the developers should be ranked, for example, the calendar year for 2012. The request can also request a ranking over a most recent time period, e.g., over the past week, month, year, or all time.

The system computes a net violation baseline for the code base (320). In order to measure the effectiveness of each developer relative to other developers that contributed source code to the code base, the system can compute a net violation baseline. The net violation baseline represents the expected net violations of a typical, high-productivity developer of the code base. Generally, productivity is measured by the amount of developer actions contributed. Alternatively, the system can measure productivity by the amount of churn.

The system can compute a value for the net violation baseline using actual violations introductions and removals committed by developers of the code base. In other words, the system can define the performance of a typical, high-productivity developer by the performance of actual contributors to the code base. Alternatively, the system can select a particular value as the net violation baseline.

For example, the system can compute the net violation baseline by computing the difference between a count of violation introductions and a count of violation removals over a corresponding count of developer actions for all violation introductions, violation removals, and churn attributed to the developers and scaling the result by a particular number m of developer actions that are representative of the contributions of a typical, high-productivity developer. In other words, the system defines a typical, high-productivity developer to be a developer who has contributed m developer actions while maintaining a net violation ratio equal to that of all developers in the code base.

The net violation baseline can be positive or negative. If positive, the typical, high-productivity developer contributes more violation introductions than violation removals. This can indicate that the developers of the code base routinely introduce more violations than they remove. If the net violation baseline is negative, the typical, high-productivity developer contributes more violation removals than violation introductions. This can indicate that the developers of the code base routinely remove more violations than they introduce. Computing the net violation baseline will be described in more detail below with reference to FIG. 4.

The system computes a score for each developer (330). In general, the score for the developer represents the expected violation introductions per developer action for a given developer, after taking into account the performance of the typical, high-productivity developer. Computing a score for a developer will be described in more detail below with reference to FIG. 5.

The system generates a ranking of developers by score (340). In general, the system sorts the developers by the computed score. When the net of violations is computed as violation introductions minus violation removals, scores having smaller values represent more effective developers. However, the net of violations may also be computed as violation removals minus violation introductions, in which case scores having larger values represent more effective developers.

The system provides the ranking in response to the request (350). For example, the system can generate a graphical presentation of the ranking, e.g., in a web page presentation, and provide the presentation to a user device for display to the user that initiated the request.

The system can also use the score in a variety of other ways, including for rewarding effective developers and targeting developer training. For example, the system can recognize high-ranking developers, for example, by sending an automatic email notification to the team to congratulate the high-ranking developers.

The system can consider developers to have a high ranking or low ranking if the developer has a rank that satisfies a particular threshold. For example, the system can consider a developer to have a high ranking if the developer is within the top-ranked 5, 10, or 20 developers on the team. Similarly, the system can consider a developer to have a low ranking if the developer is within the bottom-ranked 5, 10, or 20 developers on the team.

The system can also generate an email notification that is communicated to developers having a low rank as an encouragement to review coding standards on source code violations. The system may also generate an email notification that is communicated to a team leader or group manager of a developer having a low rank, which can enable the leader or manager to help the developer improve. The system may also determine the types of violations that are most commonly introduced by a particular developer and inform the developer of these types of violations. Because the score is not sensitive to relative amounts of churn like other methods of ranking developers, the system can avoid sending spurious notifications or email messages that are due to abnormal performance numbers due to relatively low levels of churn.

The system can also automatically suggest that a first developer having a low rank be paired with a second developer having a higher rank. The system may also automatically suggest that the second developer act as a code reviewer for the first developer. Both of these measures can help reduce the number of violation introductions attributed the first developer and can likewise help increase the number of violation removals that are attributed to the first developer. This in turn decreases the number of violations in the code base.

Figure 4:
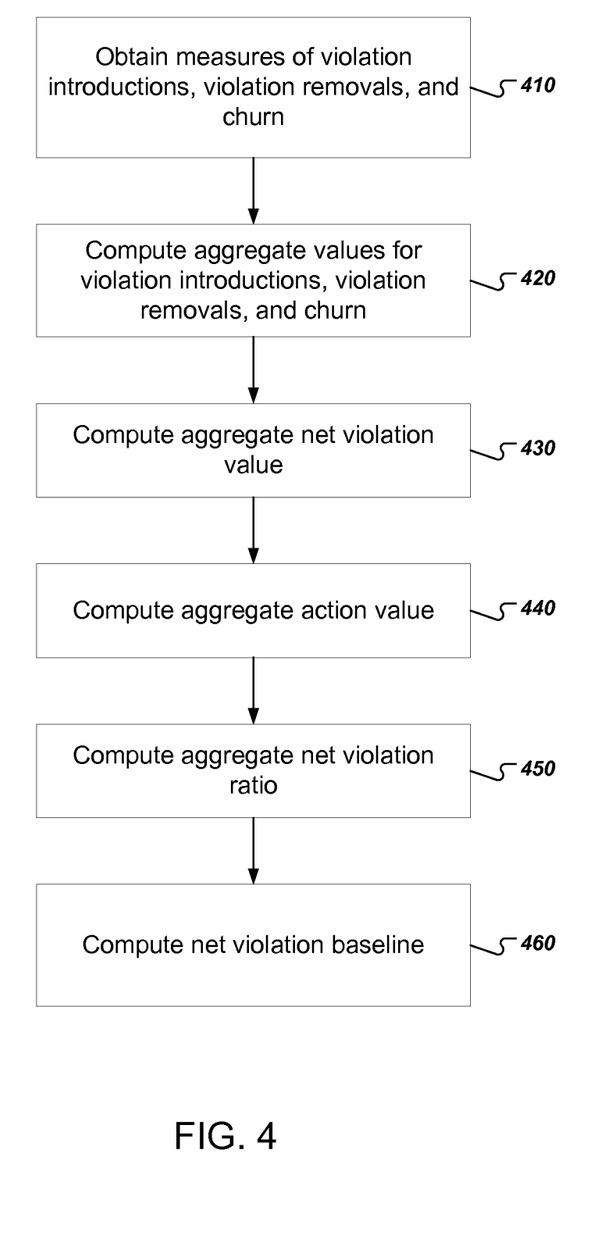
FIG. 4 is a flow chart of an example process for computing a net violation baseline.

FIG. 4 is a flow chart of an example process for computing a net violation baseline. As mentioned above, the net violation baseline represents the expected net violations of a typical, high-productivity developer of the code base. The example process can be implemented by one or more computer programs installed on one or more computers. The process will be described as being performed by an appropriately programmed system of one or more computers, e.g., the ranking engine 210 of FIG. 2.

The system obtains measures of violation introductions, violation removals, and churn attributed to developers who are relevant to the net violation baseline (410). The system can consider different groups of developers to be relevant to the computing the net violation baseline. For example, the system can consider all developers who have contributed code to the code base for all time to be relevant developers for computing the net violation baseline.

In some implementations, the system considers a time period specified by a request for a developer ranking. Then, the system can obtain the data for particular developers for the relevant time period.

For example, for each developer relevant to the request, the system can access a developer profile to obtain counts of violation introductions, violation removals, and churn attributed to each developer. The churn can represent a count of the number of lines of code added, changed, and deleted, or some sub-combination of these.

In some implementations, when computing developer scores, the system can use transformed values rather than raw counts of violation introductions, violation removals, and churn. For example, the system can transform the raw counts by normalizing or scaling the counts and using the transformed values rather than the raw counts of the violation introductions, violation removals, and churn. The system may also give more weight to some actions than others. For example, very serious violations that tend to frequently result in run-time errors can be assigned more weight than other violations that are less serious.

The system computes aggregate values for violation introductions, violation removals, and churn (420). For example, after obtaining the counts for all relevant developers, the system can sum the counts to compute an aggregate violation introduction count N, an aggregate violation removal count F, and an aggregate churn C.

The system computes an aggregate net violation value (430). The aggregate net violation value measures the difference between violation introductions and violation removals for all developers relevant to the request. For example, the system can compute an aggregate violation introduction count N and an aggregate violation removal count F. The system can then compute an aggregate net violation value as N-F.

The system computes an aggregate action value (440). The aggregate action value represents a measure of the number of developer actions by developers of the code base. For example, the system can compute the aggregate action value as the sum of the aggregate violation introduction count N, the aggregate violation removal count F, and the aggregate churn C.

Although each violation introduction and each violation removal is also counted in the aggregate churn C, the system can still use both the aggregate violation introduction count N and the aggregate violation removal count F when computing the aggregate action value because there is not necessarily a one-to-one relationship between violation introductions or removals and churn. In fact, multiple violations can be introduced or removed in a single line of churn. In other words, a single line of churn can introduce and remove zero, one, or more violations.

The system computes an aggregate net violation ratio (450). The aggregate net violation ratio compares the aggregate net violation value to the aggregate action value. In some implementations, the aggregate net violation ratio R is the aggregate net violation value divided by the aggregate action value. When these values are counts, the aggregate net violation ratio can be given by:

$$R = \frac{N - F}{N + F + C}.$$

The system computes the net violation baseline (460). In some implementations, the system computes the net violation baseline B as the aggregate net violation ratio R multiplied by a developer action baseline m. The net violation baseline B can thus be given as R×m.

The developer action baseline m is a constant that can be selected by an administrator of the system or administrative owner of the ranking engine. The developer action baseline represents a number of developer actions for a typical, high-productivity developer. By multiplying the net violation ratio by the developer action baseline, the system obtains the expected net violations of the typical, high-productivity developer of the code base.

Selecting different values for m changes the expected behavior of the typical, high-productivity developer. Selecting m to be a larger number of developer actions indicates that the net violation baseline is more representative of the expected performance of the developers of the code base, and selecting m to be a smaller number of developer actions indicates that the net violation baseline is less representative of the expected performance of the developers of the code base.

The magnitude of the developer action baseline influences the effectiveness score computed for the individual developer. In some implementations, the developer action baseline is chosen so that a particular fractile of the developers have a number of actions that is below the chosen baseline. The fractile can apply to any appropriate subset of developers, e.g., all or a subset of developers involved in a project or only developers relevant to the request.

If the developer action baseline is chosen for the fractile 0.9, the developer action baseline is a number of developer actions greater than the number of actions by 90% of developers. If the developer action baseline is chosen for the fractile 0.1, the developer action baseline is a number of developer actions greater than the number of actions by 10% of developers. If the developer action baseline is 0.5, the developer action baseline represents a median of developer actions.

As an example, if for every 90 lines of churn, developers introduce six violations and remove four, the aggregate net violation ratio R would be two net violations over 100 developer actions, or 2/100=0.02. And if the developer action baseline m is chosen to be 20,000 developer actions, the number of violations of the net violation baseline B would be:

$$B = R \times m = 0.02 \times 20{,}000 = 400.$$

While the system can compute a separate score for each developer, the system can compute the net violation baseline once. In some implementations, the system stores the net violation baseline and recomputes the net violation baseline only periodically.

Figure 5:
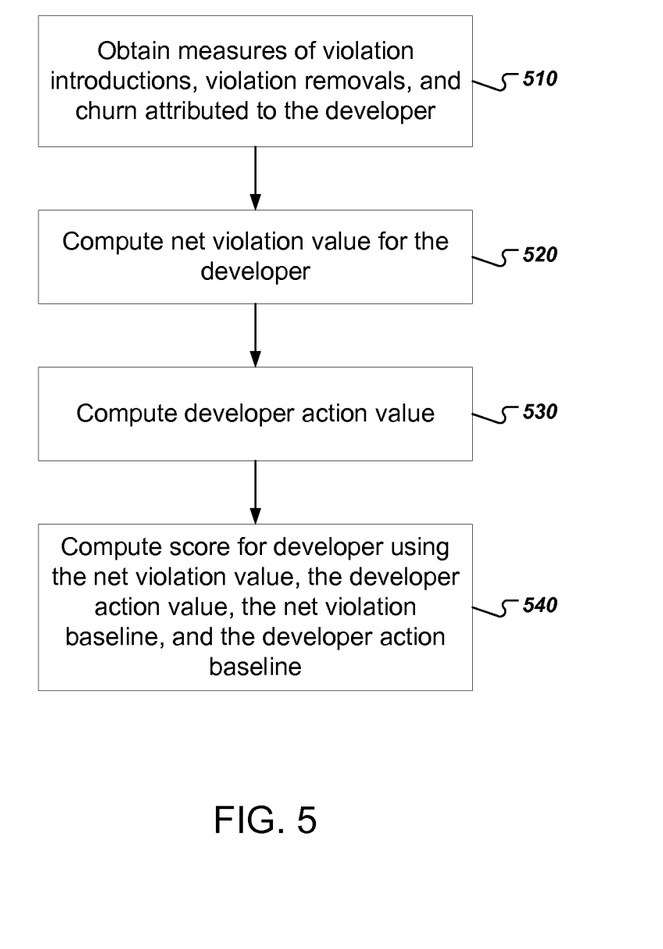
FIG. 5 is a flow chart of an example process for computing a score for a particular developer.

FIG. 5 is a flow chart of an example process for computing a score for a particular developer. A system can compute a score for a developer that represents a measure of effectiveness of the developer relative to the effectiveness of all other developers. The example process can be implemented by one or more computer programs installed on one or more computers. The process will be described as being performed by an appropriately programmed system of one or more computers, e.g., the ranking engine 210 of FIG. 2.

The system obtains measures of violations introductions, violation removals, and churn attributed to the developer (510). The system can obtain the measures from a stored developer profile for the particular developer. The system can also obtain measures that correspond to a particular time constraint specified by the request, e.g., violation introductions, removals, and churn that from the past week, month, year, or all time. The system can also obtain measures of violation introductions, violation removals, and churn attributed to the developer corresponding to work performed for a particular project or a particular subteam of developers.

The system computes a net violation value for the developer (520). The net violation value measures the difference between the count of violation introductions and violation removals attributed to the developer. For example, the system can compute a count of violation introductions n and a count of violation removals f attributed to the developer. The system can then compute a net violation value for the developer as n−f. The system may also first scale, weight, or normalize the counts of violation introductions and violation removals, as described above with reference to FIG. 4.

The system computes a developer action value (530). The developer action value represents an aggregate value for actions by a source code developer. For example, the system can compute the developer action value as a sum of counts of violation introductions attributed to the developer, violations removals attributed to the developer, and churn attributed to the developer, or n+f+c. The system can also scale, weight, or normalize the counts when computing the developer action value, as described above with reference to FIG. 4.

The system computes a score for the developer using the net violation value, the developer action value, the net violation baseline, and the developer action baseline (540). Thus, the score S for the developer can be given by:

$$S = \frac{n - f + B}{n + f + c + m},$$

where B is the net violation baseline, and m is the developer action baseline as described above with reference to FIG. 4.

The score may represent the expected long-term effect of the developer's contributions on the code base.

If, as shown in FIG. 1, Mary's score is −0.035733, for every developer action Mary performs, she is expected to remove 0.035733 violations from the code base. On the other hand, because Susan's score is positive, for every developer action Susan performs, she is expected to introduce 0.002504 violations into the code base.

In some implementations, the system can simplify the computation of the developer action value or the aggregate action value by using only the churn for each. In other words, the system can use the churn for a particular developer as the developer action value or use the churn for all developers as the aggregate action value or both.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nontransitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   obtaining data representing a plurality of developer actions for a developer, wherein each developer action is classified as being either a violation introduction attributed to the developer, a violation removal attributed to the developer, or a unit of churn attributed to the developer;
   obtaining a net violation baseline for a code base, wherein the net violation baseline represents a measure of violation introductions compared to violation removals by a typical high-productivity developer of the code base;
   obtaining a developer action baseline for the code base, the developer action baseline being a predetermined constant number of developer actions representing a number of developer actions for the typical high-productivity developer of the code base;
   computing a net violation value for the developer from the data, the net violation value representing a measure of violation introductions attributed to the developer compared to violation removals attributed to the developer;
   computing a developer action value for the developer from the data, the developer action value representing a total number of developer actions of the developer;
   computing a score including comparing the sum of the net violation value and the net violation baseline to the sum of the developer action value and the developer action baseline; and
   ranking the developer relative to one or more other developers according to the computed score.

2. The method of claim 1, wherein the score represents the expected long term effect on the code base of violation introductions and violation removals attributed to the developer.

3. The method of claim 1, wherein a particular fractile of the developers have a number of attributed actions that is less than the developer action baseline.

4. The method of claim 1, wherein the score S is given by:

$$S = \frac{n - f + B}{n + f + c + m},$$

wherein n is a count of violations introductions attributed to the developer, f is a count of violation removals attributed to the developer, B is the net violation baseline, c is the churn attributed to the developer, and m is the developer action baseline.

5. The method of claim 1, further comprising:
   determining that the developer has a rank that satisfies a threshold relative to other developers in a team of developers; and
   generating a notification to a team leader of the team of developers.

6. The method of claim 1, further comprising:
   determining that the developer has a low rank relative to other developers in a team of developers; and
   providing a suggestion that the developer be paired with another developer having a high rank.

7. The method of claim 1, further comprising:
   determining that the developer has a high rank relative to other developers in a team of developers; and
   providing a suggestion that the developer be paired with another developer having a low rank.

8. The method of claim 1, further comprising:
   generating a graphical presentation of the ranking of the developer relative to the one or more other developers; and
   providing the graphical presentation to a user device.

9. A system comprising:
   one or more computers and one or more storage devices storing instructions that are operable, when executed by the one or more computers, to cause the one or more computers to perform operations comprising:
   obtaining data representing a plurality of developer actions for a developer, wherein each developer action is classified as being either a violation introduction attributed to the developer, a violation removal attributed to the developer, or a unit of churn attributed to the developer;
   obtaining a net violation baseline for a code base, wherein the net violation baseline represents a measure of violation introductions compared to violation removals by a typical high-productivity developer of the code base;

obtaining a developer action baseline for the code base, the developer action baseline being a predetermined constant number of developer actions representing a number of developer actions for the typical high-productivity developer of the code base;

computing a net violation value for the developer from the data, the net violation value representing a measure of violation introductions attributed to the developer compared to violation removals attributed to the developer;

computing a developer action value for the developer from the data, the developer action value representing a total number of developer actions of the developer;

computing a score including comparing the sum of the net violation value and the net violation baseline to the sum of the developer action value and the developer action baseline; and ranking the developer relative to one or more other developers according to the computed score.

10. The system of claim 9, wherein the score represents the expected long term effect on the code base of violation introductions and violation removals attributed to the developer.

11. The system of claim 9, wherein a particular fractile of the developers have a number of attributed actions that is less than the developer action baseline.

12. The system of claim 9, wherein the score S is given by:

$$S = \frac{n - f + B}{n + f + c + m},$$

wherein n is a count of violations introductions attributed to the developer, f is a count of violation removals attributed to the developer, B is the net violation baseline, c is the churn attributed to the developer, and m is the developer action baseline.

13. The system of claim 9, wherein the operations further comprise:
determining that the developer has a rank that satisfies a threshold relative to other developers in a team of developers; and
generating a notification to a team leader of the team of developers.

14. The system of claim 9, wherein the operations further comprise:
determining that the developer has a low rank relative to other developers in a team of developers; and
providing a suggestion that the developer be paired with another developer having a high rank.

15. The system of claim 9, wherein the operations further comprise:
determining that the developer has a high rank relative to other developers in a team of developers; and
providing a suggestion that the developer be paired with another developer having a low rank.

16. The system of claim 9, wherein the operations further comprise:
generating a graphical presentation of the ranking of the developer relative to the one or more other developers; and
providing the graphical presentation to a user device.

17. A computer program product, encoded on one or more non-transitory computer storage media, comprising instructions that when executed by one or more computers cause the one or more computers to perform operations comprising:

obtaining data representing a plurality of developer actions for a developer, wherein each developer action is classified as being either a violation introduction attributed to the developer, a violation removal attributed to the developer, or a unit of churn attributed to the developer;

obtaining a net violation baseline for a code base, wherein the net violation baseline represents a measure of violation introductions compared to violation removals by a typical high-productivity developer of the code base;

obtaining a developer action baseline for the code base, the developer action baseline being a predetermined constant number of developer actions representing a number of developer actions for the typical high-productivity developer of the code base;

computing a net violation value for the developer from the data, the net violation value representing a measure of violation introductions attributed to the developer compared to violation removals attributed to the developer;

computing a developer action value for the developer from the data, the developer action value representing a total number of developer actions of the developer;

computing a score including comparing the sum of the net violation value and the net violation baseline to the sum of the developer action value and the developer action baseline; and ranking the developer relative to one or more other developers according to the computed score.

18. The computer program product of claim 17, wherein the score represents the expected long term effect on the code base of violation introductions and violation removals attributed to the developer.

19. The computer program product of claim 17, wherein a particular fractile of the developers have a number of attributed actions that is less than the developer action baseline.

20. The computer program product of claim 17, wherein the score S is given by:

$$S = \frac{n - f + B}{n + f + c + m},$$

wherein n is a count of violations introductions attributed to the developer, f is a count of violation removals attributed to the developer, B is the net violation baseline, c is the churn attributed to the developer, and m is the developer action baseline.

21. The computer program product of claim 17, wherein the operations further comprise:
determining that the developer has a rank that satisfies a threshold relative to other developers in a team of developers; and
generating a notification to a team leader of the team of developers.

22. The computer program product of claim 17, wherein the operations further comprise:
determining that the developer has a low rank relative to other developers in a team of developers; and
providing a suggestion that the developer be paired with another developer having a high rank.

23. The computer program product of claim 17, wherein the operations further comprise:
determining that the developer has a high rank relative to other developers in a team of developers; and
providing a suggestion that the developer be paired with another developer having a low rank.

24. The computer program product of claim 17, wherein the operations further comprise:
- generating a graphical presentation of the ranking of the developer relative to the one or more other developers; and
- providing the graphical presentation to a user device.

25. A computer-implemented method comprising:
- obtaining data representing a plurality of developer actions for a developer, wherein each developer action is classified as being either a violation introduction attributed to the developer, a violation removal attributed to the developer, or a unit of churn attributed to the developer;
- obtaining a net violation baseline for a code base, wherein the net violation baseline represents a measure of violation introductions compared to violation removals by a typical high-productivity developer of the code base;
- obtaining a developer action baseline for the code base, the developer action baseline representing a number of developer actions for the typical high-productivity developer of the code base;
- computing a net violation value for the developer from the data, the net violation value representing a measure of violation introductions attributed to the developer compared to violation removals attributed to the developer;
- computing a developer action value for the developer from the data, the developer action value representing a total number of developer actions of the developer;
- computing a score including comparing the sum of the net violation value and the net violation baseline to the sum of the developer action value and the developer action baseline;
- ranking the developer relative to one or more other developers according to the computed score;
- determining that the developer has a rank that satisfies a threshold relative to other developers in a team of developers; and
- generating a notification to a team leader of the team of developers.

* * * * *